United States Patent
Hui et al.

(10) Patent No.: US 11,733,452 B2
(45) Date of Patent: Aug. 22, 2023

(54) TERAHERTZ POLARIZATION BEAM SPLITTER BASED ON TWO-CORE NEGATIVE CURVATURE OPTICAL FIBER

(71) Applicant: Xi'an University of Posts and Telecommunications, Xi'an (CN)

(72) Inventors: Zhanqiang Hui, Xi'an (CN); Liming Gao, Xi'an (CN); Jiamin Gong, Xi'an (CN); Dongdong Han, Xi'an (CN); Haibo Ge, Xi'an (CN)

(73) Assignee: XI'AN UNIVERSITY OF POSTS AND TELECOMMUNICATIONS, Xi'an (CN)

( * ) Notice: Subject to any disclaimer, the term of this patent is extended or adjusted under 35 U.S.C. 154(b) by 0 days.

(21) Appl. No.: 17/966,085

(22) Filed: Oct. 14, 2022

(65) Prior Publication Data

US 2023/0124226 A1    Apr. 20, 2023

(30) Foreign Application Priority Data

Oct. 15, 2021   (CN) .......................... 202111201670.6

(51) Int. Cl.

| | |
|---|---|
| G02B 6/02 | (2006.01) |
| G02B 6/024 | (2006.01) |
| G02B 6/04 | (2006.01) |
| G02B 6/10 | (2006.01) |
| G02B 6/126 | (2006.01) |

(52) U.S. Cl.
CPC ......... G02B 6/02361 (2013.01); G02B 6/024 (2013.01); G02B 6/02314 (2013.01); G02B 6/02328 (2013.01); G02B 6/04 (2013.01); G02B 6/105 (2013.01); G02B 6/126 (2013.01)

(58) Field of Classification Search
CPC ........... G02B 6/02314; G02B 6/02328; G02B 6/02361; G02B 6/024; G02B 6/04; G02B 6/105; G02B 6/126
See application file for complete search history.

(56) References Cited

U.S. PATENT DOCUMENTS

| | | | | |
|---|---|---|---|---|
| 6,259,830 | B1* | 7/2001 | Bhagavatula | ......... C03B 37/026 385/11 |
| 9,791,619 | B2* | 10/2017 | Challener | .......... G01N 21/0303 |
| 9,810,837 | B2* | 11/2017 | Benabid | ............. G02B 6/02347 |
| 10,139,560 | B2* | 11/2018 | Poletti | ................. H01S 3/06729 |
| 10,393,956 | B2* | 8/2019 | Russell | ............. G02B 6/02328 |
| 10,451,421 | B2* | 10/2019 | Sanders | ............. G02B 6/02366 |
| 10,527,782 | B2* | 1/2020 | Lyngse | ............... C03B 37/0122 |

(Continued)

*Primary Examiner* — Ryan A Lepisto
(74) *Attorney, Agent, or Firm* — WPAT, PC (57) ABSTRACT

A terahertz polarization beam splitter based on a two-core negative curvature fiber is provided, which relates to the technical field of optical fiber communication. The polarization beam splitter includes: a base circular tube and core separation structures. Multiple large cladding tubes are internally tangent and connected to an inner wall of the base circular tube and arranged at equal intervals along a circumference of the inner wall of the base circular tube, and the multiple large cladding tubes are symmetrically distributed on the inner wall of the base circular tube. Embedded circular tubes are internally tangent and connected to inner walls of the multiple large cladding tubes respectively. The core separation structures are two in number.

9 Claims, 5 Drawing Sheets

(56) References Cited

U.S. PATENT DOCUMENTS

| | | | | |
|---|---|---|---|---|
| 10,693,271 | B2* | 6/2020 | Uebel | G02F 1/355 |
| 10,816,721 | B1* | 10/2020 | Chenard | G02B 6/02328 |
| 10,859,763 | B2* | 12/2020 | Xu | G02B 6/02328 |
| 11,009,657 | B2* | 5/2021 | Hawke | H01S 3/06733 |
| 11,099,319 | B2* | 8/2021 | Uebel | G02B 6/02328 |
| 11,209,591 | B2* | 12/2021 | Gao | G02B 6/02328 |
| 11,215,751 | B2* | 1/2022 | Poletti | C03B 37/0122 |
| 11,249,250 | B2* | 2/2022 | Jasion | C03B 37/02781 |
| 11,333,825 | B2* | 5/2022 | Sabert | G02B 6/02357 |
| 11,493,684 | B2* | 11/2022 | Taranta | G02B 6/02357 |
| 11,493,685 | B2* | 11/2022 | Wang | G02B 6/032 |
| 11,555,958 | B2* | 1/2023 | Sakr | G02B 6/02328 |
| 2005/0226578 | A1* | 10/2005 | Mangan | G02B 6/02347 |
| | | | | 385/125 |
| 2020/0115270 | A1* | 4/2020 | Yoo | G02B 6/02361 |
| 2020/0156987 | A1* | 5/2020 | Wheeler | G02B 6/02357 |
| 2020/0241281 | A1* | 7/2020 | Benabid | A61B 1/043 |
| 2020/0317557 | A1* | 10/2020 | Gibson | C03B 37/0122 |

* cited by examiner

TERAHERTZ POLARIZATION BEAM SPLITTER BASED ON TWO-CORE NEGATIVE CURVATURE OPTICAL FIBER

TECHNICAL FIELD

The present disclosure relates to the technical field of optical fiber communication, and in particularly, to a terahertz polarization beam splitter based on a two-core negative curvature fiber.

BACKGROUND

Over the past two decades, a research of terahertz sources and detection technologies has matured and been applied in practice, greatly contributing to the rapid development of terahertz technologies. However, since current terahertz systems mainly use discrete devices and terahertz waves are transmitted in space, the systems are bulky, costly and difficult to maintain. Thus, a terahertz optical fiber is proposed, which provides an ideal medium for the transmission of the terahertz waves. Further, compact terahertz modulators, polarizers, filters, optical switches, etc. based on micro or nano structures have been proposed, making it possible to realize a terahertz system of a small size and a compact structure. Moreover, polarization is an important characteristic of the terahertz waves, and various linear and non-linear optical effects are closely related to a polarization state of the terahertz waves, and signal processing functions such as beam splitting, filtering and switching can be performed on the terahertz waves based on the polarization characteristics, thus building of various terahertz systems with different functions have important engineering applications.

A polarization beam splitter, as a very important polarization control device, can separate two orthogonal polarization modes in an electromagnetic wave for independent subsequent processing, or combine two beams of light with perpendicular polarization directions. The polarization beam splitters play an important role in fiber optic communications, fiber optic sensing, optical instrumentation, national security, aerospace and the other fields. Due to the rapid development of the conventional fiber optic communication technology, the polarization beam splitters operating in a near infrared band have become widely commercialized. However, the development of the polarization beam splitters in a terahertz band is limited by a large absorption of a natural material in a terahertz frequency domain and a very weak electromagnetic response. Up to now, researchers have proposed several solutions, which are mainly classified as a multimode interferometer type, an antireflective coating type, a microstructure fiber type, etc., depending on their structures. Specifically, the microstructure fiber based polarization beam splitter has the advantages of low loss and easy connect with existing fiber optic communication systems, which has received more attention. The operating principle of the microstructure fiber based polarization beam splitter is coupling mode theory, where an optical fiber is designed as a two-core structure, with two orthogonal polarized beams propagating in the optical fiber with different coupling lengths. The two-core fibers can be divided into symmetrical and asymmetrical two-core structures. The symmetrical two-core structure allows both the orthogonal polarization beams to be coupled, and the coupling length of the two orthogonal polarization beams satisfies a certain relationship, while the asymmetrical two-core structure allows one of the orthogonal polarization beams to be barely coupled and the other polarization beam to be coupled in the two-core. The development of microstructure fiber type terahertz polarization beam splitters has experienced the process from solid-core fibers to porous-core fibers, and then to suspended-core fibers. By reducing the distribution of a guide mode in a substrate material, great progress has been made in reducing material absorption loss but the guide mode is still partially present in the substrate material, which does not guarantee a low effective material loss.

SUMMARY

In order to solve the problems existing in the related art, the present disclosure provides a terahertz polarization beam splitter based on a two-core negative curvature fiber. The polarization beam splitter includes: a base circular tube and core separation structures; multiple large cladding tubes are internally tangent and connected to an inner wall of the base circular tube and arranged at equal intervals along a circumference of the inner wall of the base circular tube, and the multiple large cladding tubes are symmetrically distributed on the inner wall of the base circular tube; embedded circular tubes are internally tangent and connected to inner walls of the multiple large cladding tubes respectively; the core separation structures are two in number, and the two core separation structures are symmetrically arranged in the base circular tube and are externally tangent and connected to two large cladding tubes of the multiple large cladding tubes respectively; and an area inside the base circular tube except the multiple large cladding tubes and the two core separation structures is filled with air medium.

In a preferable embodiment, the multiple large cladding tubes are 12 in number, and a quantity of the embedded circular tubes is equal to a quantity of the multiple large cladding tubes.

In a preferable embodiment, an internally tangent connection point between each of the embedded circular tubes and a corresponding one large cladding tube of the multiple large cladding tubes and an internally tangent connection point between the corresponding one large cladding tube and the base circular tube are located on a same radius line of the base circular tube, and the internally tangent connection point between the embedded circular tube and the corresponding one large cladding tube is proximate to the inner wall of the base circular tube.

In a preferable embodiment, each of the two core separation structures includes two first small circular tubes and two second small circular tubes, the two first small circular tubes are externally tangent and connected to each other, each of the two second small circular tube are externally tangent and connected to each of the two first small circular tubes, and the two first small circular tubes and the two second small circular tubes form a cross-shaped structure; in the cross-shaped structure, one first small circular tube of the two first small circular tubes is externally tangent and connected to one large cladding tube of the two large cladding layer tubes; and an internally tangent connection point between the one large cladding tube and one embedded circular tube of the embedded circular tubes corresponding to the one large cladding tube, an internally tangent connection point between the one large cladding tube and the base circular tube, and an externally connection point between the one first small circular tube and the one large cladding tube are located on a same radius line of the base circular tube.

In a preferable embodiment, a thickness of each of the multiple large cladding tubes is $t_1$, which is in a range from 89.1 μm to 90.9 μm; an outer radius of each of the multiple large cladding tubes is $r_1$, which is in a range from 376.2 μm to 383.8 μm; a distance between centers of each two adjacent large cladding tubes of the multiple large cladding tubes is Λ, which is in a range from 801.9 μm to 818.1 μm, and a distance between centers of each two symmetrical large cladding tubes of the multiple large cladding tubes is 4Λ.

In a preferable embodiment, an outer radius of each of the embedded circular tubes is $r_3$, which is in a range from 172.36 μm to 175.84 μm; a distance between centers of each two adjacent embedded circular tubes of the embedded circular tubes is $(2Λ+r_1-t_1-r_3)/(2 \cos 15°)$; a distance between centers of each two symmetrical embedded circular tubes of the embedded circular tubes is $2×(2Λ+r_1-t_1-r_3)$; and a thickness of each of the embedded circular tubes is $t_2$, which is in a range from 89.1 μm to 90.9 μm.

In a preferable embodiment, an outer radius of each first small circular tube (4) and an outer radius of each second small circular tube (5) are $r_2$, which is in a range from 158.4 μm to 161.6 μm; and a thicknesses of each first small circular tube (4) and a thickness of each second small circular tube (5) each are $t_3$, which is in a range from 89.1 μm to 90.9 μm.

In a preferable embodiment, a length of the terahertz polarization beam splitter is in a range from 6.162 cm to 6.286 cm.

In a preferable embodiment, $t_1=90$ μm, $r_1=380$ μm, $Λ=810$ μm, $r_3=174.1$ μm, $r_2=160$ μm, $t_2=90$ μm, $t_3=90$ μm, and the length of the terahertz polarization beam splitter is 6.224 cm.

In a preferable embodiment, the base circular tube, the core separation structures, the second small circular tubes, the multiple large cladding tubes, and the embedded circular tubes are each composed of a cyclic-olefin copolymer material.

In a preferable embodiment, a refractive index of the cyclic-olefin copolymer material is in a range from 1.50 to 1.54 under a terahertz frequency.

The technical solutions provided by the embodiment of the present disclosure may have at least following beneficial effects.

Firstly, for the structure based on the two-core negative curvature optical fiber of the present disclosure, the multiple large cladding tubes are internally tangent and connected to the inner wall of the base circular tube and arranged at equal intervals along the circumference of the inner wall of the base circular tube, the embedded circular tubes are internally tangent and connected to inner walls of the multiple large cladding tubes respectively, and the core separation structures symmetrical up and down divides a fiber core into a core A and a core B, such that coupling lengths of two polarized lights, i.e., x-polarized light and y-polarized light, are different, and the coupling lengths of the two polarized lights satisfy a relationship that a coupling length of the y-polarized light is twice that a coupling length of the x-polarized light. The two cores, the core A and the core B, are respectively distributed in left and right air areas. When the x-polarized light and the y-polarized light are input into one of the two cores A and B, the y-polarized light is completely coupled into the other core of the two cores A and B, while the x-polarized light is coupled twice and still in the original core, that is to say, the two polarized lights are output from different ports, so that the polarization beam splitter of the present disclosure has a wide working frequency range, two kinds of polarized lights each have a high extinction ratio at output ports and a low transmission loss.

Secondly, the base circular tube, the first small circular tubes, the second small circular tubes, the large cladding tubes, and the embedded circular tubes of the polarization beam splitter of the present disclosure each have a circular tube structure, and thus the polarization beam splitter has a simple structure and a high technological feasibility, and the preparation thereof is more convenient.

Thirdly, through defining structural parameters of the polarization beam splitter of the present disclosure, it can be known that, when a frequency of an incident light is 1 THz and the length of the polarization beam splitter is 6.224 cm, an extinction ratio of the x-polarized light reaches 120.8 dB, and a bandwidth corresponding to the extinction ratio above 20 dB is 0.024 THz (0.9925 THz to 1.0165 THz); and the extinction ratio of the y-polarized light reaches 63.74 dB, and a bandwidth corresponding to the extinction ratio above 20 dB is 0.02 THz (0.9924 THz to 1.0114 THz), an effective absorption loss is as low as 0.037 dB/cm, and tolerance analysis shows that the polarization beam splitter can still maintain good performance when each of the structural parameters is within ±1% deviation.

BRIEF DESCRIPTION OF DRAWINGS

In order to more clearly explain the technical solutions in embodiments of the present disclosure, accompanying drawings required to be used in the description of the embodiments will be briefly introduced. It is apparent that the accompanying drawings in the following description are merely some embodiments of the present disclosure, and for those of ordinary skill in the art, other drawings can be obtained according to these accompanying drawings without any creative effort.

Reference numbers: 1—base circular tube; 2—large cladding tube; 3—embedded circular tube; 4—first small circular tube; 5—second small circular tube.

DETAILED DESCRIPTION OF EMBODIMENTS

In order to make objectives, technical solutions and advantages of the present disclosure clearer, embodiments of the present disclosure will be described hereinafter combined with accompanying drawings.

Figure 1:
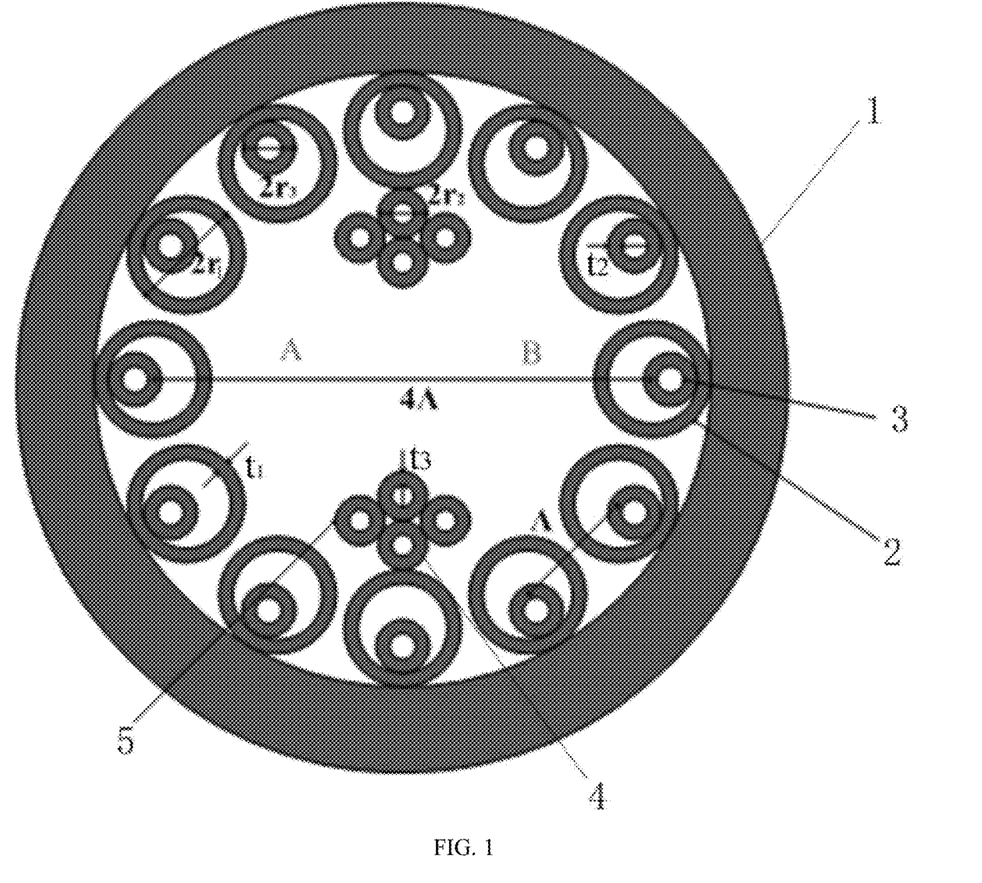
FIG. 1 illustrates a schematic cross-sectional view of a terahertz polarization beam splitter based on a two-core negative curvature optical fiber according to an embodiment of the present disclosure.

Referring to FIG. 1, a terahertz polarization beam splitter based on a two-core negative curvature optical fiber is shown, which includes a base circular tube 1 and core separation structures. 12 large cladding tubes 2 (also referred to as cladding large tube) are internally tangent and connected to an inner wall of the base circular tube 1 and arranged at equal intervals along a circumference of an inner wall of the base circular tube 1. The large cladding tubes 2 are symmetrically distributed on the inner wall of the base circular tube 1. Embedded circular tubes 3 are internally tangent and connected to inner walls of the large cladding tubes 2 respectively. An internally tangent connection point between each of the embedded circular tubes 3 and a corresponding one large cladding tube 2 of the multiple large cladding tubes 2 and an internally tangent connection point between the corresponding one large cladding tube 2 and the base circular tube 1 are located on a same radius line of the base circular tube 1, and the internally tangent connection point between the embedded circular tube 3 and the corresponding one large cladding tube 2 is proximate to the inner wall of the base circular tube 1. The core separation structures are two in number. The two core separation structures are symmetrically arranged in the base circular tube 1, and are externally tangent and connected to two large cladding tubes 2 of the large cladding tubes 2 respectively. An area inside the base circular tube 1 except the large cladding tubes 2 and the two core separation structures is filled with air medium.

Each of the two core separation structures may include two first small circular tubes 4 (also referred to as first circular small tubes) and two second small circular tubes 5 (also referred to as second circular small tubes). The two first small circular tubes 4 are externally tangent and connected to each other. Each of the two second small circular tube 5 are externally tangent and connected to each of the two first small circular tubes 4. The two first small circular tubes 4 and the two second small circular tubes 5 form a cross-shaped structure. In the cross-shaped structure, one first small circular tube 4 of the two first small circular tubes 4 is externally tangent and connected to one large cladding tube 2 of the two large cladding tubes 2. An internally tangent connection point between the one large cladding tube 2 and one embedded circular tube 3 of the embedded circular tubes 3 corresponding to the one large cladding tube 2, an internally tangent connection point between the one large cladding tube 2 and the base circular tube 1, and an externally connection point between the one first small circular tube 4 and the one large cladding tube 2 are located on a same radius line of the base circular tube 1.

In a preferable embodiment, the base circular tube 1, the first small circular tubes 4, the second small circular tubes 5, the large cladding tubes 2 and the embedded circular tubes 3 are each composed of a cyclic-olefin copolymer material with a refractive index at terahertz frequency of 1.50 to 1.54. A length of each of the base circular tube 1, the first small circular tubes 4, the second small circular tubes 5, the large cladding tubes 2, and the embedded circular tubes 3 is in a range from 6.162 cm to 6.286 cm. A thickness of each of the large cladding tubes 2 is $t_1$, which is in a range from 89.1 μm to 90.9 μm. An outer radius of each of the large cladding tubes 2 is $r_1$, which is in a range from 376.2 μm to 383.8 μm. A distance between centers of each two adjacent large cladding tubes 2 is $\Lambda$, which is in a range from 801.9 μm to 818.1 μm. A distance between centers of each two symmetrical large cladding tubes 2 is $4\Lambda$. An outer radius of each of the embedded circular tubes 3 is $r_3$, which is in a range from 172.36 μm to 175.84 μm. A distance between centers of each two adjacent embedded circular tubes 3 is $(2\Lambda+r_1-t_1-r_3)/(2\cos 15°)$. A distance between centers of each two symmetrical embedded circular tubes 3 is $2\times(2\Lambda-r_1-t_1-r_3)$. A thickness of each of the embedded circular tubes 3 is $t_2$, which is in a range from 89.1 μm to 90.9 μm. An outer radius of each first small circular tube 4 and an outer radius of each second small circular tube 5 are $r_2$, which is in a range from 158.4 μm to 161.6 μm. A thicknesses of each first small circular tube 4 and a thickness of each second small circular tube 5 are $t_3$, which is in a range from 89.1 μm to 90.9 μm. Referring to FIG. 1, the polarization beam splitter is divided into a core A on the left and a core B on the right by the core separation structures.

It should be noted that, the polarization beam splitter, as a very important polarization control device, has a wide range of application values, whether in optical communication, or in sensing, imaging, medical diagnosis and other fields. With the gradual development of terahertz technologies, there are many terahertz polarization beam splitters with novel structures in recent decades, each of the many terahertz polarization beam splitters is based on different polarization beam splitting principles, and each of the many terahertz polarization beam splitters has its own features. With its superior adaptability to optical communication systems, a micro-structured fiber polarization beam splitter will greatly reduce the cost of designing and manufacturing terahertz polarization beam splitters with excellent performance. For existed terahertz polarization beam splitters based on microstructure fiber, due to the inherent absorption loss of materials, it is difficult for the polarization beam splitter to achieve a relative low effective absorption loss, and an extinction ratio thereof is not very high.

The base circular tube 1, the first small circular tubes 4, the second small circular tubes 5, the large cladding tubes 2, and the embedded circular tubes 3 of the terahertz polarization beam splitter based on the two-core negative curvature optical fiber of the embodiment of the present disclosure each have a circular tube structure, and thus the preparation thereof is more convenient. Due to the structure of the polarization beam splitter, coupling lengths of two polarized lights are different, and the coupling lengths of the two polarized lights satisfy a relationship that a coupling length of y-polarized light is twice that a coupling length of x-polarized light. Two cores, the core A and the core B, are respectively distributed in left and right air areas. When the x-polarized light and the y-polarized light are input into one of the two cores A and B, the y-polarized light is completely coupled into the other core of the two cores A and B, while the x-polarized light is coupled twice and still in the original core, that is to say, the two polarized lights are output from different core ports, so that the polarization beam splitter of the embodiment of the present disclosure has a wide working frequency range (0.024 THz), two kinds of polarized lights (x and y) each have a high extinction ratio at output ports, a low transmission loss, a simple structure and high technological feasibility.

It should also be noted that optimal parameters of the structure of the polarization beam splitter of the embodiment of the present disclosure are set as follows: $t_1$=90 µm, $r_1$=380 µm, Λ=810 µm, $r_3$=174.1 µm, $t_2$=90 µm, $r_2$=160 µm, $t_3$=90 µm, and a length of the polarization beam splitter of 6.224 cm, and examples are illustrated by the optimal parameters.

Figure 2:
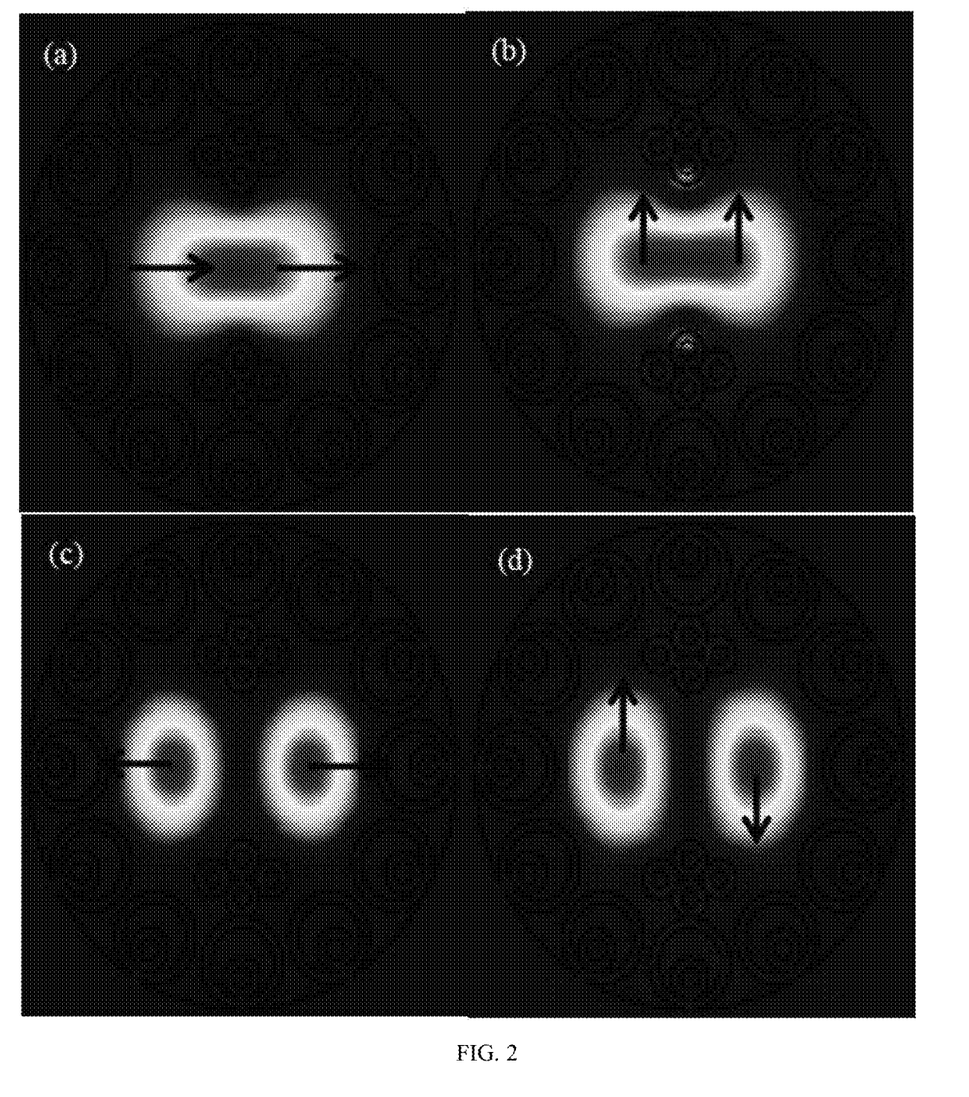
FIG. 2 illustrates a mode distribution views of four non-degenerate modes of a terahertz polarization beam splitter based on a two-core negative curvature optical fiber according to an embodiment of the present disclosure.

FIG. 2 illustrates mode distribution views of four non-degenerate modes generated when a frequency of an incident light of the polarization beam splitter of the present disclosure is selected to be 1 THz (away from a resonance frequency). In FIG. 2, (a) presents x-polarized even mode (also referred to as x-even), (b) represents y-polarized even mode (also referred to as y-even), (c) represents x-polarized odd mode (also referred to as x-odd), and (d) is y-polarized odd mode (also referred to as y-odd), where electric field directions corresponding to the even modes are the same, and field directions corresponding to the odd modes are different.

Figure 3:
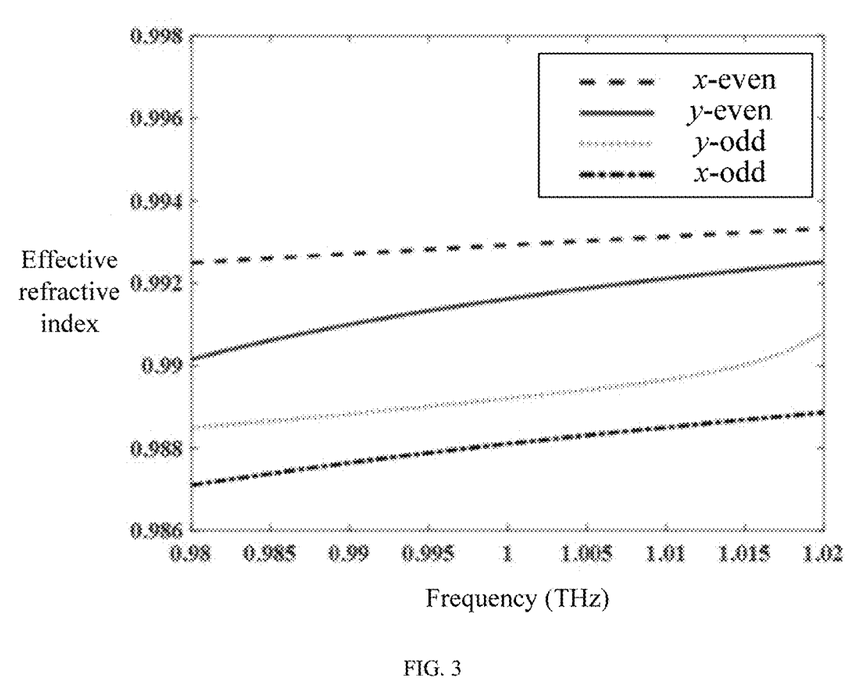
FIG. 3 illustrates graphs of effective refractive indices of four nondegenerate modes of a terahertz polarization beam splitter based on a two-core negative curvature optical fiber according to an embodiment of the present disclosure as a function of a frequency of an incident light.

FIG. 3 illustrates graphs of effective refractive indices of four non-degenerate modes of a polarization beam splitter according to an embodiment of the present disclosure as a function of a frequency of an incident light. Due to a non-circular symmetry of the structure of the polarization beam splitter, birefringence is added, and thus the effective refractive indices of the four modes are different. Relationships between the effective refractive indices of the four modes is: x-polarized even mode>y-polarized even mode>y-polarized odd mode>x-polarized odd mode. As can be seen from FIG. 3, near 1 THz, a difference between of refractive indexes of the x-polarized even mode and the x-polarized odd mode decreases, while a difference between of refractive indexes of the y-polarized even mode and the y-polarized odd mode increases.

Figure 4:
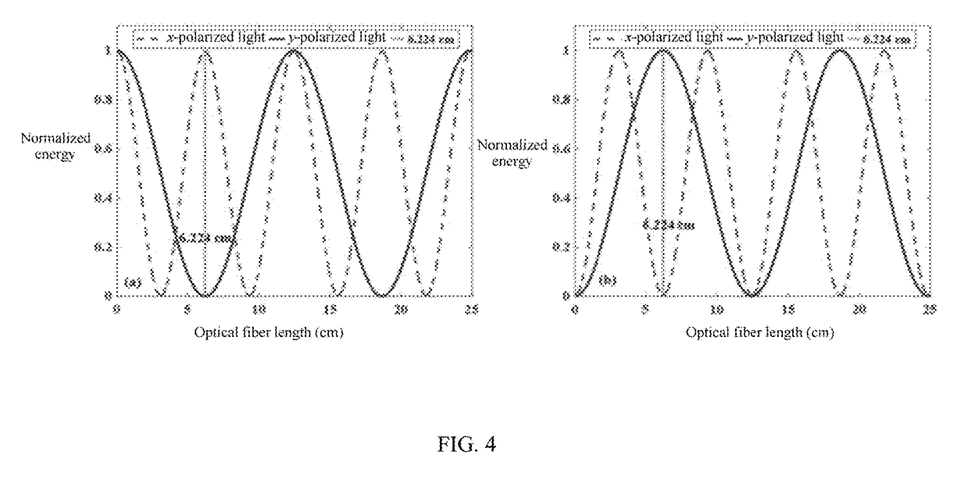
FIG. 4 illustrates graphs of normalized energies $P_{out}^x$ and $P_{out}^y$ of two polarized lights perpendicular to each other in two cores of a terahertz polarization beam splitter based on a two-core negative curvature optical fiber according to an embodiment of the present disclosure as a function of a transmission distance, when a frequency of an incident light of the terahertz polarization beam splitter is 1 THz.

FIG. 4 illustrates graphs of normalized energies $P_{out}^x$ and $P_{out}^y$ of two polarized lights perpendicular to each other in the two cores A and B of the polarization beam splitter of the present disclosure as a function of a transmission distance, when a frequency of an incident light of the polarization beam splitter is 1 THz. The x-polarized light and the y-polarized light are input from a port of the core A, and a power of the incident lights are normalized, and it is assumed that $P_{in}^x$=1, $P_{in}^y$=1, it can be seen that a light energy of a specific polarized light periodically changes in the two cores. In this polarization beam splitter, when the x-polarized light and the y-polarized light are input from the port of the core A, in the core A, when a transmission distance of each of the lights in the optical fiber is 6.224 cm, the energy of the x-polarized light reaches the maximum and the energy of the y-polarized light reaches the minimum; while in the core B, the energy of the x-polarized light reaches the minimum and the energy of the y-polarized light reaches the maximum, and thus the y-polarized light and the x-polarized light are completely separated. That is to say, when the incident light with the frequency of 1 THz is input into one core of the terahertz polarization beam splitter based on the two-core negative curvature optical fiber, an optical power of the y-polarized light is almost completely coupled into the other core of the terahertz polarization beam splitter under a coupling action, while the x-polarized light is still mostly distributed in the original core after two coupling actions. Therefore, the two polarized lights reaches the maximum output powers in the core A and the core B respectively, and the two cores respectively output the x-polarized light and the y-polarized light.

Figure 5:
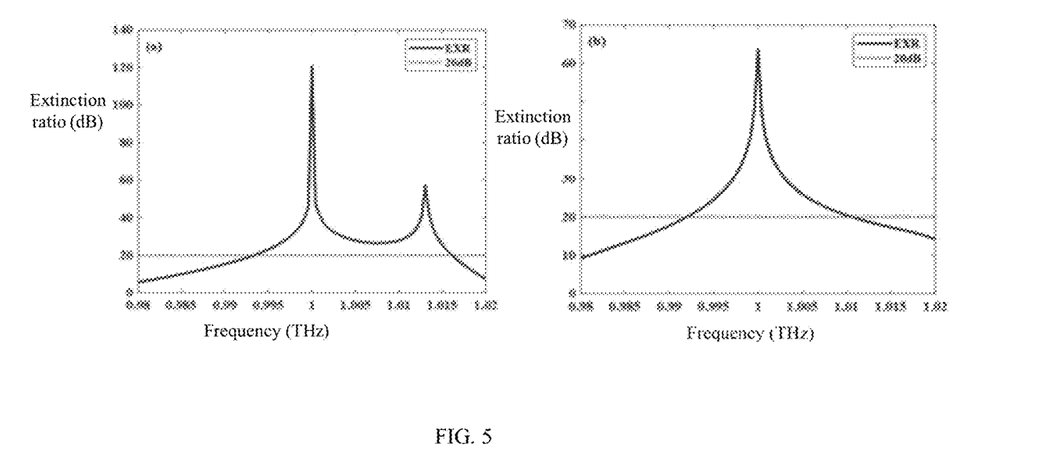
FIG. 5 illustrates graphs of extinction ratios of orthogonally polarized lights at output ports of two core of a terahertz polarization beam splitter based on a two-core negative curvature optical fiber according to an embodiment of the present disclosure as a function of a frequency of an incident light.

FIG. 5 illustrates graphs of extinction ratios of orthogonally polarized lights at output ports of the core A and the core B of the polarization beam splitter of the present disclosure as a function of a frequency of an incident light, when a length of the polarization beam splitter is 6.224 cm. In FIG. 5, (a) represents a graph of an extinction ratio graph corresponding to the core A, and (b) represents a graph of an extinction ratio corresponding to the core B. It can be seen from the FIG. 5 that, when the frequency of the incident light is 1 THz, the extinction ratio of the x-polarized light at a port of the core A reaches 120.8 dB, and a bandwidth of the x-polarized light is 0.024 THz; and the extinction ratio of the y-polarized light at a port of the core B reaches 63.74 dB, and a bandwidth of the y-polarized light 0.02 THz. It demonstrates that a performance of polarization beam splitter is excellent in the bandwidth range, which meets the requirements of wide bandwidth and high extinction ratio.

Figure 6:
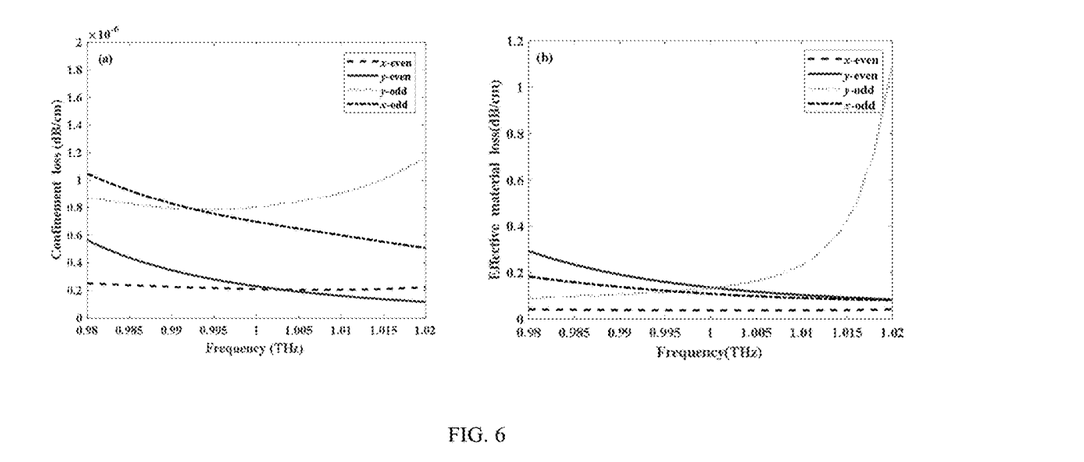
FIG. 6 illustrates graphs of confinement losses and effective absorption losses of a terahertz polarization beam splitter based on a two-core negative curvature optical fiber according to an embodiment of the present disclosure as a function of a frequency.

FIG. 6 illustrates graphs of confinement losses and effective absorption losses of the polarization beam splitter of the present disclosure as a function of a frequency. In FIG. 6, (a) represents the confinement losses and (b) represents the effective absorption losses. It can be seen from the FIG. 6 that in a studied frequency range from 0.98 THz to 1.02 THz, only the losses of the y-polarized odd mode show an upward trend, and the losses of the other three modes all decrease with the increase of frequency. The minimum of the confinement loss is 10-6 dB/cm, and the minimum of the effective absorption loss is 0.037 dB/cm. Compared with the related work, the present disclosure has a lower confinement loss and a lower effective absorption loss. The transmission loss is a sum of the confinement loss and the effective absorption loss, and is mainly determined by the effective absorption loss, i.e., 0.037 dB/cm.

Figure 7:
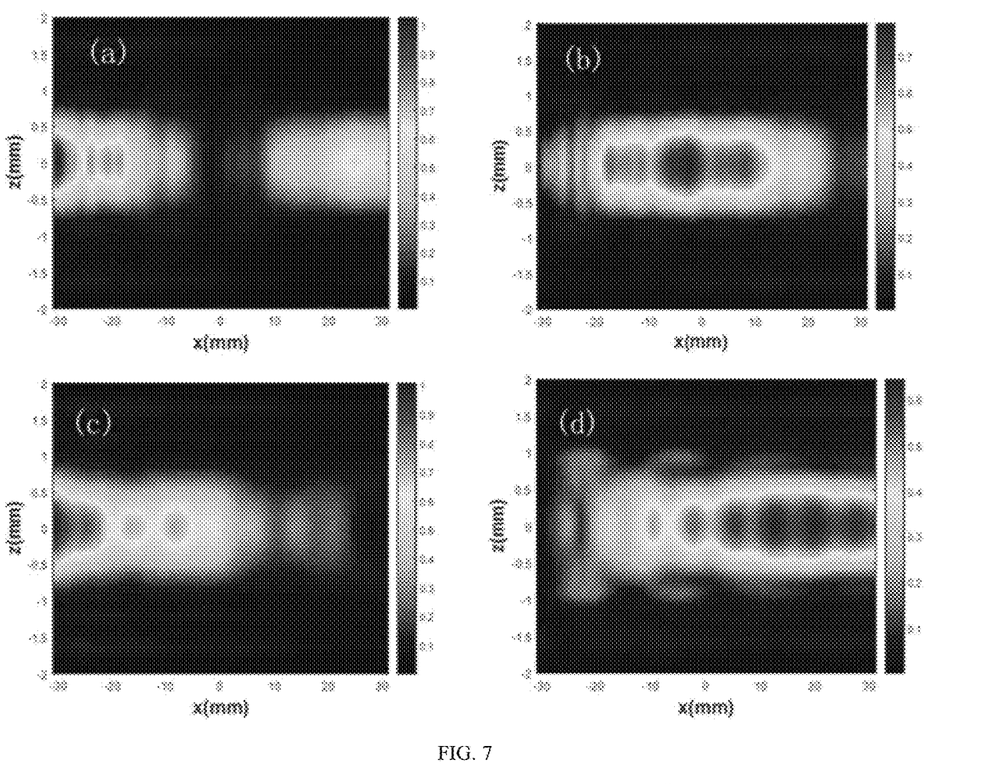
FIG. 7 illustrates graphs showing transmission situations of x-polarized light and y-polarized light in two cores of a terahertz polarization beam splitter based on a two-core negative curvature optical fiber according to an embodiment of the present disclosure, when the two polarized lights are respectively input into one of the two cores.

FIG. 7 illustrates views showing transmission situations of x-polarized light and y-polarized light in the two cores of the polarization beam splitter of the present disclosure, when the x-polarized light and y-polarized light are respectively input into one of the two cores. It is assumed that the x-polarized light and the y-polarized light are individually input from one core (core A), and the transmission situations of lights in the two cores is observed. In FIG. 7, (a) and (b) respectively represent the transmission situations of x-polarized light in the core A and core B, when the x-polarized light is input into the core A, and (c) and (d) respectively represent the transmission situations of y-polarized light in the core A and core B, when the y-polarized light is input into the core A. As can be seen from the FIG. 7, when the x-polarized light is input into the one core, since a length of the polarization beam splitter is twice as long as a coupling length of the x-polarized light, the x-polarized light undergoes two complete coupling states during the transmission process, and the x-polarized light is still output at the original port; for the y-polarized light, the length of the polarization beam splitter is just equal to a coupling length of the y-polarized light, and the y-polarized light undergoes one complete coupling state during the transmission process, and the energy of the y-polarized light is almost completely coupled into the other core, therefore, the y-polarized light is output from a port of the other core. Specifically, these four views show the whole beam splitting process of the polarization beam splitter of the present disclosure.

Figure 8:
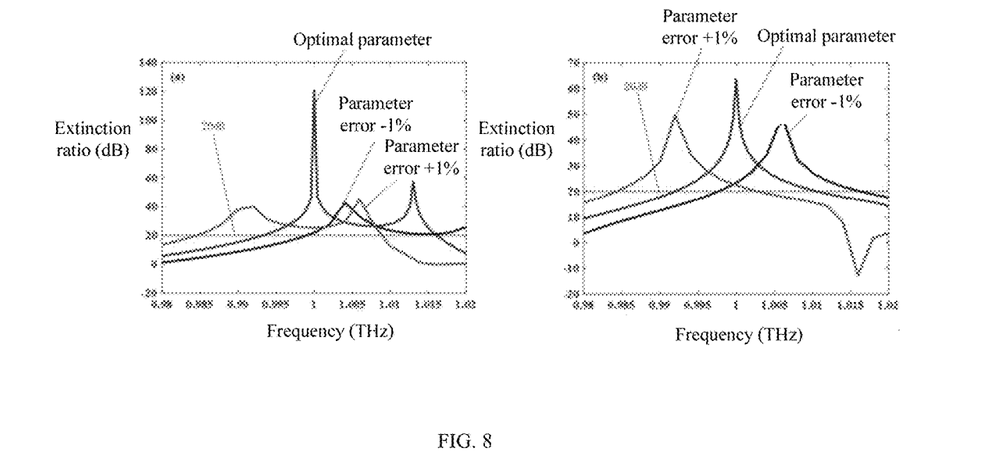
FIG. 8 illustrates graphs showing the change of extinction ratios under an error of all structural parameters of a terahertz polarization beam splitter based on a two-core negative curvature optical fiber according to an embodiment of the present disclosure of ±1%.

FIG. 8 illustrates graphs showing the change of extinction ratios of the core A and the core B under an error of all structural parameters of the polarization beam splitter of the present disclosure of ±1%. In FIG. 8, (a) represents a graph showing the change of the extinction ratio of the core A and (b) represents a graph showing the change of the extinction ratio of the core B. It can be seen that a frequency corresponding to a peak extinction ratio shifts, a frequency corresponding to the error of +1% shifts to the left, a frequency corresponding to the error of −1% shifts to the right. In the presence of the error, the extinction ratio at 1 THz is still at 20 dB and the working bandwidth is around 0.02 THz, with good polarization beam splitting performance, which indicates that the structure has a large process tolerance.

The above-mentioned serial numbers of embodiments of the present disclosure are for description merely, and do not represent the advantages and disadvantages of the embodiments.

The above is only preferred embodiments of the present disclosure, and it is not intended to limit the present disclosure. Any modification, equivalent substitution, improvement, etc. made within the spirit and principle of the present disclosure should be included in the scope of protection of the present disclosure.

What is claimed is:

1. A terahertz polarization beam splitter based on a two-core negative curvature optical fiber, comprising: a base circular tube (1) and core separation structures;

wherein a plurality of large cladding tubes (2) are internally tangent and connected to an inner wall of the base circular tube (1) and arranged at equal intervals along a circumference of the inner wall of the base circular tube (1), and the plurality of large cladding tubes (2) are symmetrically distributed on the inner wall of the base circular tube (1);

wherein embedded circular tubes (3) are internally tangent and connected to inner walls of the plurality of large cladding tubes (2) respectively;

wherein the core separation structures are two in number, and the two core separation structures are symmetrically arranged in the base circular tube (1) and are externally tangent and connected to two large cladding tubes (2) of the plurality of large cladding tubes (2) respectively;

wherein an area inside the base circular tube (1) except the plurality of large cladding tubes (2) and the two core separation structures is filled with air medium;

wherein each of the two core separation structures comprises two first small circular tubes (4) and two second small circular tubes (5);

wherein the two first small circular tubes (4) are externally tangent and connected to each other; each of the two second small circular tube (5) are externally tangent and connected to each of the two first small circular tubes (4); and the two first small circular tubes (4) and the two second small circular tubes (5) form a cross-shaped structure;

wherein in the cross-shaped structure, one first small circular tube (4) of the two first small circular tubes (4) is externally tangent and connected to one large cladding tube (2) of the two large cladding layer tubes (2); and wherein an internally tangent connection point between the one large cladding tube (2) and one embedded circular tube (3) of the embedded circular tubes (3) corresponding to the one large cladding tube (2), an internally tangent connection point between the one large cladding tube (2) and the base circular tube (1), and an externally connection point between the one first small circular tube (4) and the one large cladding tube (2) are located on a same radius line of the base circular tube (1).

2. The terahertz polarization beam splitter based on the two-core negative curvature optical fiber according to claim 1, wherein the plurality of large cladding tubes (2) are 12 in number, and a quantity of the embedded circular tubes (3) is equal to a quantity of the plurality of large cladding tubes (2).

3. The terahertz polarization beam splitter based on the two-core negative curvature optical fiber according to claim 2, wherein an internally tangent connection point between each of the embedded circular tubes (3) and a corresponding one large cladding tube (2) of the plurality of large cladding tubes (2) and an internally tangent connection point between the corresponding one large cladding tube (2) and the base circular tube (1) are located on a same radius line of the base circular tube (1), and the internally tangent connection point between the embedded circular tube (3) and the corresponding one large cladding tube (2) is proximate to the inner wall of the base circular tube (1).

4. The terahertz polarization beam splitter based on the two-core negative curvature optical fiber according to claim 1, wherein a thickness of each of the plurality of large cladding tubes (2) is $t_1$, which is in a range from 89.1 μm to 90.9 μm; an outer radius of each of the plurality of large cladding tubes (2) is $r_1$, which is in a range from 376.2 μm to 383.8 μm; a distance between centers of each two adjacent large cladding tubes (2) of the plurality of large cladding tubes (2) is Λ, which is in a range from 801.9 μm to 818.1 μm; and a distance between centers of each two symmetrical large cladding tubes (2) of the plurality of large cladding tubes (2) is 4Λ.

5. The terahertz polarization beam splitter based on the two-core negative curvature optical fiber according to claim 4, wherein an outer radius of each of the embedded circular tubes (3) is $r_3$, which is in a range from 172.36 μm to 175.84 μm; a distance between centers of each two adjacent embedded circular tubes (3) of the embedded circular tubes (3) is $(2\Lambda+r_1-t_1-r_3)/(2\cos 15°)$; a distance between centers of each two symmetrical embedded circular tubes (3) of the embedded circular tubes (3) is $2\times(2\Lambda+r_1-t_1-r_3)$; and a thickness of each of the embedded circular tubes (3) is $t_2$, which is in a range from 89.1 μm to 90.9 μm.

6. The terahertz polarization beam splitter based on the two-core negative curvature optical fiber according to claim 1, wherein an outer radius of each first small circular tube (4) and an outer radius of each second small circular tube (5) are $r_2$, which is in a range from 158.4 μm to 161.6 μm; and a thicknesses of each first small circular tube (4) and a thickness of each second small circular tube (5) each are $t_3$, which is in a range from 89.1 μm to 90.9 μm.

7. The terahertz polarization beam splitter based on the two-core negative curvature optical fiber according to claim 6, wherein a length of the terahertz polarization beam splitter is in a range from 6.162 cm to 6.286 cm.

8. The terahertz polarization beam splitter based on the two-core negative curvature optical fiber according to claim 1, wherein the base circular tube (1), the core separation structures, the plurality of large cladding tubes (2) and the embedded circular tubes (3) are each composed of a cyclic-olefin copolymer material.

9. The terahertz polarization beam splitter based on the two-core negative curvature optical fiber according to claim

8, wherein a refractive index of the cyclic-olefin copolymer material is in a range from 1.50 to 1.54 under a terahertz frequency.

\* \* \* \* \*